United States Patent [19]

Barta

[11] 4,244,978

[45] Jan. 13, 1981

[54] ATTACHMENT INHIBITION OF MEAT SPOILAGE ORGANISMS TO MEAT

[76] Inventor: Kent S. Barta, 214 N. Sarah, St. Louis, Mo. 63103

[21] Appl. No.: 67,682

[22] Filed: Aug. 20, 1979

Related U.S. Application Data

[63] Continuation-in-part of Ser. No. 951,194, Oct. 13, 1978, abandoned.

[51] Int. Cl.$^3$ .............................................. A23B 4/08
[52] U.S. Cl. ................................... 426/332; 426/335; 426/532; 426/641; 426/652
[58] Field of Search ............... 426/92, 304, 310, 327, 426/332, 335, 532, 641, 652; 422/32, 37, 40

[56] References Cited

U.S. PATENT DOCUMENTS

| | | | |
|---|---|---|---|
| 1,681,009 | 8/1928 | Petersen | 426/332 X |
| 3,745,026 | 7/1973 | Hansen et al. | 426/332 |
| 3,819,329 | 6/1974 | Kaestner et al. | 426/335 X |
| 3,958,020 | 5/1976 | de Vries | 426/332 X |
| 3,996,386 | 12/1976 | Malkki et al. | 426/641 X |
| 4,021,585 | 5/1977 | Svoboda et al. | 426/332 |

OTHER PUBLICATIONS

Anderson et al., "Efficacies of Three Sanitizers Under Six Conditions of Application to Surfaces of Beef", *J. Food Science*, 42:326 (1977).

Notermans et al., "Attachment of Some Bacterial Strains to the Skin of Broiler Chickens", *Br. Poult. Sci.*, 15:573 (1974).

Dougherty, "Salmonella Contamination in a Commercial Poultry (Broiler) Processing Operation", *Poultry Sci.*, 53:814 (1974).

Tso et al., "Negative Chemotaxis in *Escherichia coli*", *J. Bact.*, 118:560 (1974).

Benarde et al., "Kinetics and Mechanism of Bacterial Disinfection by Chlorine Dioxide", *Appl. Microbiol.*, 15:257 (1967).

Chet et al., "Repulsion of Bacteria from Marine Surfaces", *Appl. Microbiol.*, 30:1043 (1975).

*Primary Examiner*—Arthur L. Corbin

[57] ABSTRACT

A process for preventing attachment and growth of spoilage bacteria on the surface of freshly slaughtered meat carcasses utilizes substantially nontoxic concentrations of chlorine dioxide to inhibit the attachment of such bacteria without formation of detectable chlorinated organic compounds. The chlorine dioxide solution is applied as a low pressure spray immediately post-slaughter to prevent establishment of a bacterial load directly derived from the conditions of slaughter, and during the subsequent chill period to prevent substantial recontamination.

3 Claims, 1 Drawing Figure

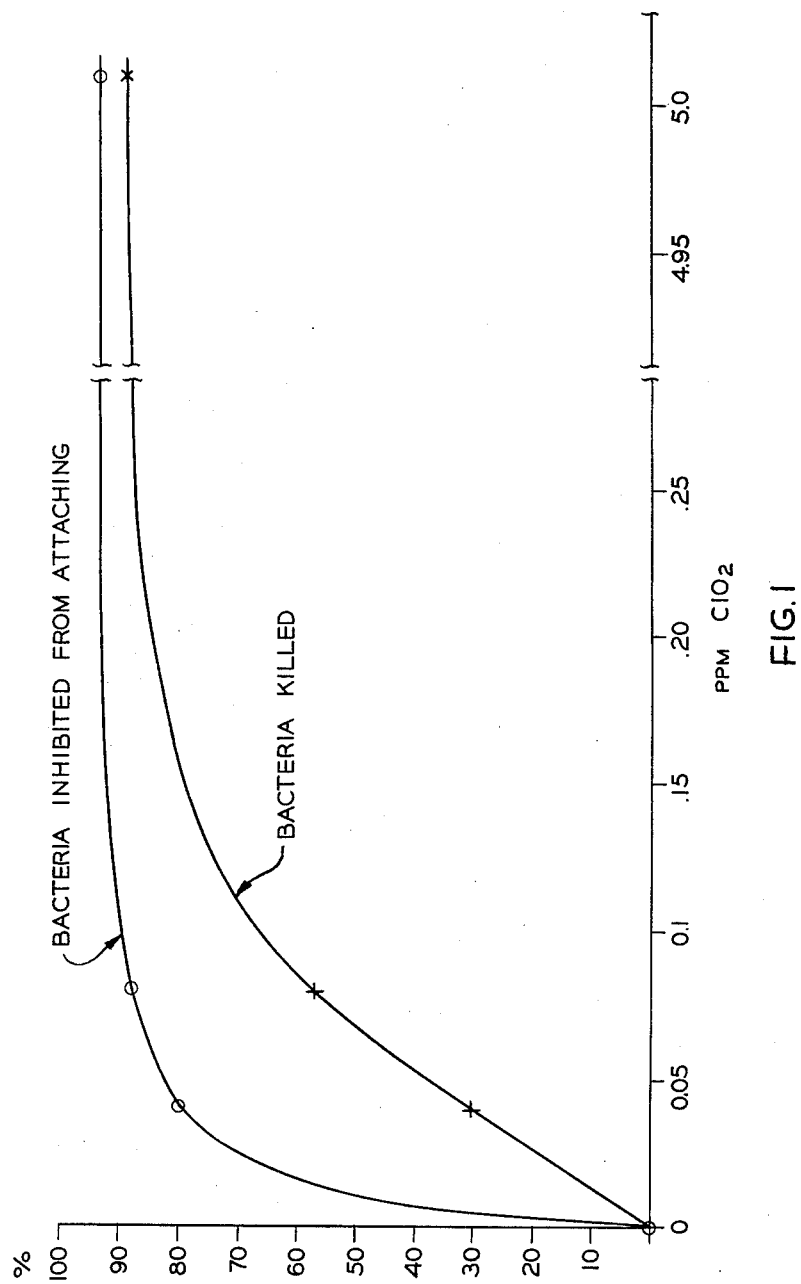

4,244,978

ATTACHMENT INHIBITION OF MEAT SPOILAGE ORGANISMS TO MEAT

CROSS-REFERENCE TO RELATED APPLICATION

This application is a continuation-in-part of my prior co-pending application, Ser. No. 951,194, entitled "Inhibition of Attachment of Meat Spoilage Organisms", filed Oct. 13, 1978, now abandoned.

BACKGROUND OF THE INVENTION

Modern rapid distribution systems for fresh meats rely upon refrigeration and plant sanitation to provide a wholesome product to the consumer. Although fresh meats in the United States are generally safe and free of hazardous levels of pathogens, the microbial quality may be poor; high levels of non-pathogenic spoilage bacteria, frequently present, dramatically shorten shelf-life and affect the taste and appearance of the meat. In response to this problem, several states and the Federal Government have adopted or proposed standards regulating the bacterial content of fresh meat.

It is recognized that refrigeration is not a complete solution to spoilage problems because the principal spoilage bacteria are psychrotrophs which grow well at 5°–15° C., or mesotrophs which are adapted to grow at lower temperatures. Ayres, J. C. (*Food Research*, 25:1, 1960) found that the dominant microorganisms growing on refrigerated beef comprised the Micrococci and Pseudomonads; even at temperatures as high as 15° C. the growing bacterial population was dominated by motile gram negative rods of the Pseudomonas generae. Other bacteria commonly present of fresh meat include the gram negative, flagellated generae: Serratia, Aeromonas, Proteus, etc. Together with the Pseudomonads, these are responsible for off-color and slime production in decaying meat. Mesotrophs, typically the food-borne pathogens such as Salmonella, *E. coli* and gram positive anaerobes such as Clostridia, are now believed to be "free riders" and, particularly at refrigerated temperatures, do not grow appreciably on meat surfaces; despite their dangerous nature they have no substantial role in food spoilage. (For example, see Goepfert, J. M., *J. Milk Food Technol.*, 38:449, 1975).

Bacterial contamination of retail meat has been the subject of extensive studies whose conclusions are here set forth. The microorganisms present in retail portions are derived directly from the initial bacterial load on the carcass surface immediately post-slaughter; thus, meat portions, such as hamburger, having high bacterial counts are traceable to carcasses having high surface contamination. (For example, see Elliot, et al., *Applied Microbiology*, 9:452, 1961). The primary source of such contamination is the gut and hide of the animal itself, although the packing house environment (floors, chill room, cutting room, etc.), and handling by packing house workers are all substantial sources of contamination. (Frazier, *Food Microbiology*, Chapt. 16, 2d ed., 1967) Prolonged storage, as in aging, also increases contamination from the air, etc. Subsequent handling, as in transit, cutting, boning and packing, may offer serious contaminating events.

Several available processes eliminate bacteria from meat by killing them with a contact disinfectant(s) applied in the form of a spray to the carcass surface during chilling. U.S. Pat. No. 3,745,026 (Hansen) discloses such a process utilizing 50–200 ppm of aqueous chlorine (hypochlorous acid). U.S. Pat. No. 4,021,585 (Svoboda, et al.) describes an alternative process utilizing 5–50 ppm of aqueous chlorine dioxide. Both processes achieve reduced bacterial counts during the chill cycle (18–24 hrs. post-slaughter) by killing bacteria introduced onto the carcass during slaughter procedures. This is shown by the reduction in viable colony-forming bacteria present at the end of the chill cycle as compared with counts at the beginning of such period after carcasses are conveyed to the chill room from the kill floor.

A major problem with such use of chlorinated contact disinfectants is reaction of the agent with meat components to produce chloro-organic derivatives such as chloro-substituted lipids and chloro-aromatic compounds. These chlorinated derivates pose a potential health hazard, especially the class of halomethanes (known to be carcinogenic) formed by reaction of bactericidal levels of hypochlorous acid with humic or other organic substances. Reaction of chlorine dioxide at bactericidal concentrations with meat components results in lower but detectable levels of organic chlorine.

Other agents such as inorganic and organic acids have also been applied to carcass surfaces in the form of aqueous sprays, as described in Carpenter, J. A., *Proc. Meat Indust. Res. Conf.*, Chicago, 1972. Use of these agents has not received widespread acceptane because of substantial surface damage to the carcass, and the off-odors and flavors imparted to the meat at bacteriostatic concentrations.

SUMMARY OF THE INVENTION

A principal object of the present invention is to provide a process which prevents the attachment and growth of spoilage organisms at the surface of freshly slaughtered meat carcasses. A further object is to prevent establishment of spoilage bacteria on carcass surfaces without completely destroying the microflora thereof. A still further object is to prevent establishment of spoilage bacteria on carcass surfaces without utilizing bactericidal concentrations of chlorine dioxide known to result in detectable levels of organic chlorine upon reaction with meat components.

Briefly summarizing, and without limiting the scope hereof, I have discovered that application to carcass surfaces of aqueous chlorine dioxide at concentrations too low to be effective as a bactericide nevertheless substantially inhibits attachment of spoilage organisms and prevents their growth upon the meat substrate. Chlorine dioxide solutions at concentrations as low as 100 fold lower than heretofore used are effective for inhibiting attachment provided that their application to carcass surfaces commences at a time substantially coincident with contaminating events, as during slaughter procedures and subsequent chilling. At such low concentrations, no detectable organic chlorine is produced by reaction of the chlorine dioxide with meat components.

BRIEF DESCRIPTION OF THE DRAWING

FIG. 1 is a rectilinear plot of the data presented in parts A and B of Example I.

DESCRIPTION OF THE PREFERRED EMBODIMENT

In the present method, aqueous solutions of chlorine dioxide, so weak as to be substantially subtoxic, are first applied substantially coincident with (that is, as close as feasible in point of time with) a significant contaminating event, and thereafter continued by intermittent spraying. Thus, in slaughtering operations, such a solution is first applied as a low pressure (less than 45 psi) spray to meat carcass surface immediately post-slaughter and substantially coincident in time with dehiding and dressing procedures on the kill floor. In addition, shrouds for beef may be soaked in the chlorine dioxide solution prior to draping. Carcasses (customarily in halves or quarters) are then conveyed to a chill room and an aqueous chlorine dioxide solution is intermittently applied to such carcass portions over a conventional 14–24 hr. chill period. This method is adapted to such processing of fress meat of domestic animals including but not limited to pork, beef, veal, and lamb.

Typically, the chlorine dioxide is generated on site with conventional apparatus and formed into solution with potable water to a concentration of 0.04–1.0 ppm (mg/l), preferably less than about 0.1 ppm (mg/l) prior to application. For reasons hereinafter more fully explained, it is critical that the solution be applied to carcass surfaces on the kill floor at a time substantially coincident with contaminating events such as dehiding, disembowelment, etc. Thereafter, the chlorine dioxide solution is applied intermittently during chilling for such intervals and in such volume as prescribed by USDA regulations (generally a maximum total of 0.5 hr. spraying time in increments during the entire chill cycle).

Significant contaminating events may occur thereafter, for example where carcasses are transshipped such as by rail or on ocean-going vessels. Handling during such transshipment may expose the meat to substantial numbers of spoilage organisms. Hence, promptly on any significant contaminating event, the chlorine dioxide solution is applied to their surfaces and is thereafter applied, preferably by intermittent spraying, during subsequent cold storage.

For purpose of this application, the term "cold storage" includes chilling of freshly slaughtered carcasses; and the term "substantially coincident with a contaminating event" means either immediately before such event, or as it takes place, or so shortly thereafter that attachment of meat spoilage organisms has not yet in fact occurred. While the preferred method of applying the solution to meat surfaces is by spraying, other methods may be used, such as washing or dipping at the time of kill, or on any contaminating event thereafter, or in the storage room; while and during cold storage application may be by such a procedure or by misting into the atmosphere at a constant low rate instead of intermittent spraying.

To be considered bactericidal in the meat slaughtering field, a solution should be effective to kill at least about 85%–90% of contaminating bacteria, as disclosed in U.S. Pat. No. 4,021,585. That patent shows chlorine dioxide is so bactericidal at concentrations minimally 5.0 ppm.

In the present process, application of chlorine dioxide solutions at substantially subtoxic concentrations, that is, less than considered bactericidal, and preferably about 0.04–1.0 ppm, has been found to prevent attachment of spoilage microorganisms to meat surfaces. Further, application of such substantially nontoxic concentrations will prevent growth of spoilage organisms on the meat surface so as to avoid subsequent spoilage. Therefore, in the present process, the solution is applied before the spoilage organisms have any opportunity to attach. Thus, in contrast to previous methods, application of such solutions is begun on the kill floor where the bacterial load derived from the hide and gut first comes into contact with the meat surface. Thereafter, subsequent contamination is prevented by further applications of the solution, as by intermittent spraying of carcasses during the chill cycle.

The examples herein demonstrate that typical spoilage organisms, i.e., Aeromonas, Pseudomonas, etc., possess a biological attachment mechanism when contacted with a raw meat surface. As used herein, the term biological attachment mechanism refers to those macromolecular components of the bacterial cell surface which effect specific adherence to some substrates but not others. Biological attachment is thus distinguished from the mere nonspecific entrapment of bacteria, in which dead cells adhere, as well as live ones, in a fibrous matrix such as meat, or from simple electrostatic interaction.

Example I indicates that the specific biological attachment mechanism of spoilage bacteria is strongly inhibited by the use of substantially nontoxic levels of chlorine dioxide in aqueous solution. Surprisingly, flagellated *E. coli* K-12 (see Example II), known to exhibit specific biological attachment to animal skin, shows only a low-level nonspecific "attachment" to raw meat surfaces. These results suggest that the present process is particularly suitable for eliminating contamination of raw meat by spoilage organisms without further disturbing the microecology of the meat. Thus, rapid spoilage of fresh meat is avoided and formation of slime produced by the gram negative psychrotroph is retarded without providing a selective advantage to pathogens.

Other advantages in the present process will become apparent from the following examples.

EXAMPLE I

The following tests demonstrated that concentrations of chlorine dioxide insufficient to be toxic to meat spoilage organisms nevertheless prevented their attachment to beef cubes.

*Aeromonas hydrophilis* was isolated from contaminated beef samples embedded in 0.5% McConkey agar and incubated at 37° for three days. Glistening mucoid colonies grew up at the surface of the meat, spreading outward into the soft agar.

This isolate *A. hydrophilis* was grown in modified tryptone broth (5.0 g/l Difco tryptone, 0.5 g/l Difco yeast extract, 5.0 g/l NaCl, 0.1% glucose) supplemented with 5.0 uC/ml $^3$H-leucine (New England Nuclear) to a density of approximately $3 \times 10^8$ cells/ml. The culture was centrifuged at 8,000 r.p.m. in a Sorval centrifuge, washed two times in minimal buffer (0.01 M $KPO_4$ pH 7.0, 0.5% NaCl, 0.001 M $MgSO_4$), and resuspended in minimal buffer, which serves as the attachment medium.

As part A of these tests, beef cubes (approximately 1.0 gram), excised aseptically from the center of a freshly slaughtered beef round, were first treated by immersion in 25 ml of various concentrations of aqueous chlorine dioxide for 3 minutes. The cubes were removed, blotted dry aseptically, and immersed in 10 ml of the bacterial suspension. Bacteria were allowed to attach for 5 minutes at 23° C. They were rinsed by immersion in an excess of minimal buffer, blotted and assayed for $^3H$ in a Beckmann scintillation counter. Viability was determined by plating aliquots of serial dilutions of a homogenate prepared by blending the beef cubes in a conventional blender in 25 ml of minimal buffer.

As part B of the tests, beef cubes were first immersed in 10 ml of the bacteria suspension for 5 minutes at 23° C. to permit attachment, drained and blotted. The cubes were then rinsed by immersion in an excess of minimal buffer, blotted and immersed in 25 ml of various concentrations of chlorine dioxide for 3 minutes. The cubes were then rinsed again in an excess of minimal buffer and assayed conventionally for $^3H$ counts and viability.

TABLE I

| A. hydrophilis | ppm ClO$_2$ | | | |
|---|---|---|---|---|
| | 0 | 0.04 | 0.08 | 5.0 |
| A. *CPM-$^3H$-labelled cells attaching after ClO$_2$ treatment | 743 | 150 | 91 | 50 |
| % of control | 100 | 20 | 13 | 7 |
| % inhibition | 0 | 80 | 87 | 93 |
| B. Viability per gram of pre-attached cells treated subsequently with ClO$_2$ | 5.0492** | 4.8291 | 4.6749 | 4.1467 |
| % of control | 100 | 70.0 | 42.3 | 12.3 |
| % reduction | 0 | 30.0 | 57.7 | 87.7 |

*counts per minute/gram meat
**log$_{10}$ cells/gram meat

In Part A, above, *A. hydrophilis* was uniformly labeled with $^3H$-leucine and tested for attachment to beef cubes *after* treatment with various concentrations of ClO$_2$. The data show that pre-treatment of meat cubes with chlorine dioxide at levels at least as low as 0.04 ppm substantially prevents attachment or adherence of microorganisms to the meat substrate compared to the untreated control. In part B, however, bacteria already attached or adhering to the meat are not readily killed at concentrations of ClO$_2$ less than about 0.1 to 0.5 ppm, as indicated by colony-forming ability at 0.04 ppm approaching that of the untreated control.

In order to form a colony, bacteria must be able to reproduce, synthesizing macromolecular cellular components such as protein, nucleic acids, etc. Low levels of ClO$_2$ thus do not substantially disrupt vital cell processes such as protein synthesis, but do interfere with the biological attachment mechanism of typical food-spoilage organisms. This experiment illustrates the efficacy of utilizing ClO$_2$ at levels too low to produce detectable levels of chlorinated organic compounds upon contact with the meat, but which prevent attachment (and subsequent reproduction) of spoilage microorganisms.

The data of part A and part B of these experiments are plotted in FIG. 1 at 5.0 ppm, substantially 90% of adherent bacteria are killed, in agreement with data disclosed in U.S. Pat. No. 4,021,585, and at this high concentration inhibition of attachment of new contaminants (part A) is indistinguishable from cell killing. At lower concentrations, bactericidal effectiveness decreases rapidly; however, new contaminants are powerfully inhibited from attaching at these low concentrations.

EXAMPLE II

Table II summarizes the results of an experiment identical in format to part A of Example I, except that a wild-type *E. coli* lacking K88 and pili-associated adhesion antigens was substituted for the *A. hydrophilis*, $^3H$-thymidine (5uC/ml) was substituted for $^3H$-leucine in cell-labelling. Also, the cell suspension contained greater than $2.5 \times 10^8$ cells/ml since binding levels, as determined in pilot experiments, were markedly lower than for *A. hydrophilis*.

TABLE II

| E. coli K-12 | ppm ClO$_2$ | | | |
|---|---|---|---|---|
| | 0.0 | 0.5 | 1.0 | 5.0 |
| CPM**-$^3H$-labelled cells attaching after ClO$_2$ treatment | 544 | 623 | 536 | 328 |
| % of control | 100 | 114 | 98.1 | 60.3 |
| % inhibition | 0 | 0 | 1.9 | 39.7 |

*Courtesy of B. Peoples, Department of Microbiology, St. Louis University School of Medicine.
**Counts $^3H$ per minute/gram meat The data indicates that concentrations with ClO$_2$ up to known bactericidal levels were ineffective to prevent low level attachment of *E. coli* to meat surfaces. Even cells actually killed at 5 ppm ClO$_2$ treatment were only partially prevented from attaching; subtoxic levels of ClO$_2$ did not interfere with this nonspecific attachment.

The present data indicates that a wild-type *E. coli* (lacking a pathogenic biological attachment mechanism), also appears to lack a biological mechanism for attachment to meat. This suggests that the present process is particularly effective against organisms having a biological attachment mechanism (spoilage bacteria and possibly pathogens); it does not affect the nonpathogenic "free riders" which do not grow appreciably under refrigeration to cause spoilage.

EXAMPLE III

*Pseudomonas aeruginosa* (American Type Culture Collection, courtesy of Midwest Medical Laboratory, St. Louis, Mo.), another common meat spoilage organism, was grown in modified tryptone broth containing $^3H$-leucine as described in Example I. Spot tests on thinly sliced meat strips (1 cm$^2$) were carried out as follows: 0.015 ml aliquot of the bacteria were spotted on the surface of meat strips previously treated by immersion in aqueous solutions of 0, 0.05, and 5.0 ppm ClO$_2$. The spots so applied tended to spread out over the surface of the meat strips more or less uniformly. The strips were placed in Petri dishes and incubated for 2 hours at 37° C. The strips were then removed and rinsed in 3.0 mls minimal buffer and the radioactivity in the rinse and on the meat was determined.

After the 2-hour incubation, 25.7% of total counts were bound to the meat surface treated with 5.0 ppm ClO$_2$, 21% of total counts were bound to the 0.05 ppm ClO$_2$-treated strip, and 52% of total counts were bound to the untreated strip. The results indicate that at 0.05 ppm, bacterial attachment was inhibited, and the cells did not substantially recover their attachment function after 2 hours' incubation. The present process may therefore be carried out utilizing the intermittent spray cycle mandated by the U.S. Department of Agriculture; it is not necessary to apply the ClO$_2$ solution continuously.

EXAMPLE IV

Meat cubes were prepared and treated, as described in Example I hereinabove, with aqueous chlorine dioxide in various concentrations (zero, trace, 0.1, 0.5, 5.0, 10.0, 50.0 and 100.0). The cubes, seeded with *A. hydrophilis,* were placed spacedly in Petri plates. Molten soft McConky agar (0.2%) supplemented with $2\times10^{-4}M$ glucose was poured into the plates so as to fully immerse the cubes. The plates were covered tightly to avoid evaporative loss of water and incubated for four days at 37° C.

Results then observed were as follows:

Those cubes treated with chlorine dioxide at concentrations of 5.0 ppm or greater (i.e., bactericidal concentrations) showed no slime development. At all lesser concentrations a spreading slime front, evidencing bacterial growth, developed outwardly into the soft agar at the edges of the cubes.

At the concentrations of 0.1 ppm and 0.5 ppm, the slime formation was confined to a narrow perimeter (1-2 mm) around the cubes; whereas the trace and control cubes showed a spreading slime front wider than 1 cm.

These results indicate that levels of chlorine dioxide insufficient to kill the cells nevertheless significantly retarded production of the slime characteristically secreted by the test organism.

An advantage of the present invention is minimization of the production of chloro-organic derivatives such as chloro-substituted lipids and chloro-aromatic compounds, generally referred to herein as organic chlorine. These are suspect of being carcinogenic or toxic. The health risks from such organic chlorine decreases at least in proportion to the concentration of the chlorine disinfectant applied to meat. Chlorine dioxide in solution at approximately the lowest prior art level, 7 ppm, when applied to hog skin, has been found to cause formation of a level or organic chlorine barely within the resolution capability of available instrumentation. No detectable levels will be found of chlorine dioxide concentrations as low as 0.04 to 1.0 ppm. Thus, in the present use of chlorine dioxide at levels as low as 100 fold lower than heretofore used, any formation of organic chlorine is minimal.

I claim:

1. The process of avoiding spoilage of freshly slaughtered meat comprising the steps of
   forming an aqueous solution of chlorine dioxide in a concentration of 0.04-1.0 ppm,
   said concentration being great enough to substantially inhibit the attachment of meat spoilage organisms to said meat and
   insufficient to form with the meat detectable levels of organic chlorine,
   washing, with said solution, freshly killed meat carcasses within a time prior to substantial attachment of such meat spoilage organisms to said meat carcasses and thereafter
   intermittently applying said solution to said carcasses during chilling.

2. The process of avoiding spoilage of freshly slaughtered meat comprising the steps of
   forming an aqueous solution of chlorine dioxide in a concentration of 0.04-1.0 ppm,
   said concentration being great enough to substantially inhibit the attachment of meat spoilage organisms to said meat and
   less than that which is substantially toxic to such meat spoilage organisms;
   washing, with said solution, freshly killed meat carcasses within a time prior to substantial attachment of such meat spoilage organisms to said meat carcasses, and
   thereafter intermittently applying said solution to said carcasses during chilling.

3. The process of avoiding spoilage of raw meat comprising the steps of
   applying an aqueous solution of chlorine dioxide, in a concentration of 0.04-1.0 ppm, to the meat surfaces
   at a time substantially coincident with a contaminating event by meat spoilage microorganisms, said concentration being less than that which is toxic to such meat spoilage microorganisms and
   great enough to substantially inhibit their attachment to the meat surfaces
   whereby to prevent establishment of such meat spoilage microorganisms on said meat surfaces and substantially retard thereafter their secretion of slime, and thereafter
   applying such solution to said meat surfaces during cold storage.

* * * * *